United States Patent
Belloni et al.

(10) Patent No.: US 9,244,175 B2
(45) Date of Patent: Jan. 26, 2016

(54) METHOD AND APPARATUS FOR TESTING RECEIVED SIGNALS IN A RADIO SIGNAL POSITIONING SYSTEM

(75) Inventors: Fabio Belloni, Espoo (FI); Ville Ranki, Espoo (FI); Antti Kainulainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 685 days.

(21) Appl. No.: 13/634,659

(22) PCT Filed: Mar. 17, 2010

(86) PCT No.: PCT/IB2010/051162
§ 371 (c)(1),
(2), (4) Date: Dec. 19, 2012

(87) PCT Pub. No.: WO2011/114189
PCT Pub. Date: Sep. 22, 2011

(65) Prior Publication Data
US 2013/0096861 A1    Apr. 18, 2013

(51) Int. Cl.
G01S 19/23    (2010.01)
G01C 17/38    (2006.01)
G06F 19/00    (2011.01)
G01S 3/72    (2006.01)
G01S 5/02    (2010.01)

(52) U.S. Cl.
CPC ............... *G01S 19/235* (2013.01); *G01S 3/72* (2013.01); *G01S 5/021* (2013.01)

(58) Field of Classification Search
CPC .......... G01S 19/235; G01S 3/72; G01S 5/021
USPC ........... 702/72, 79, 94; 342/357.23, 368, 450, 342/465; 455/456.2, 456.6, 513
See application file for complete search history.

(56) References Cited

U.S. PATENT DOCUMENTS

| | | | |
|---|---|---|---|
| 5,999,131 A | 12/1999 | Sullivan | 342/465 |
| 6,313,786 B1* | 11/2001 | Sheynblat et al. | 342/357.23 |
| 2001/0022558 A1 | 9/2001 | Karr, Jr. et al. | 342/450 |
| 2001/0053699 A1* | 12/2001 | McCrady et al. | 455/513 |
| 2003/0117320 A1 | 6/2003 | Kim et al. | 342/457 |
| 2004/0127230 A1 | 7/2004 | Bevan et al. | 455/456.5 |
| 2005/0285793 A1 | 12/2005 | Sugar et al. | 342/465 |
| 2006/0025158 A1 | 2/2006 | Leblanc et al. | 455/456.2 |
| 2007/0001867 A1 | 1/2007 | Rowe et al. | 340/825.49 |
| 2010/0019954 A1 | 1/2010 | Mizutani et al. | 342/147 |
| 2011/0244891 A1* | 10/2011 | Ghinamo | 455/456.6 |
| 2012/0319900 A1* | 12/2012 | Johansson et al. | 342/368 |

FOREIGN PATENT DOCUMENTS

| | | |
|---|---|---|
| CA | 2639015 A1 | 2/2010 |
| CN | 1351716 A | 5/2002 |
| CN | 1425139 A | 6/2003 |
| EP | 1094335 A1 | 4/2001 |
| WO | WO-97/46034 A1 | 12/1997 |

(Continued)

*Primary Examiner* — John H Le
(74) *Attorney, Agent, or Firm* — Harrington & Smith

(57) ABSTRACT

A method including receiving signals associated with multiple antenna elements; obtaining a parameter of the received signals for at least some of the multiple antenna elements; testing the obtained parameters; if the test fails, rejecting the received signals for use in positioning the apparatus; if the test passes, using the received signals for positioning the apparatus.

16 Claims, 8 Drawing Sheets

(56) References Cited

FOREIGN PATENT DOCUMENTS

| WO | WO 00/69198 | 11/2000 |
| WO | WO 2004/092762 A1 | 10/2004 |
| WO | WO-2009/056150 A | 5/2009 |
| WO | WO-2010/009763 A1 | 1/2010 |

* cited by examiner

METHOD AND APPARATUS FOR TESTING RECEIVED SIGNALS IN A RADIO SIGNAL POSITIONING SYSTEM

FIELD OF THE INVENTION

Embodiments of the present invention relate to positioning. In particular, they relate to a method, an apparatus, a module, a chipset or a computer program for positioning using radio signals.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, some of these techniques do not result in an accurate position being determined, and others are too complex for use simply in a portable apparatus. For example, the amount of processing power required to perform the technique may be impractical to provide in a portable apparatus, which may need to perform concurrent functions.

BRIEF DESCRIPTION OF VARIOUS EMBODIMENTS OF THE INVENTION

According to various embodiments of the invention there is provided A method comprising: receiving signals associated with multiple antenna elements; obtaining a parameter of the received signals for at least some of the multiple antenna elements; testing the obtained parameters; if the test fails, rejecting the received signals for use in positioning the apparatus; if the test passes, using the received signals for positioning the apparatus.

According to various embodiments of the invention there is provided An apparatus comprising: detection circuitry configured to detect a parameter of received signals associated with respective multiple antenna elements; testing circuitry configured to test the obtained parameters and configured to enable rejection of the received signals for use in positioning the apparatus if the test fails, and configured to enable use of the received signals in positioning the apparatus if the test passes.

According to various embodiments of the invention there is provided A computer program which when loaded into a processor enables the processor to: test parameters obtained from received signals associated with respective multiple antenna elements; enable rejection of the received signals for use in positioning an apparatus if the test fails, and enable use of the received signals in positioning the apparatus if the test passes.

According to various embodiments of the invention there is provided a system comprising: a source configured to transmit radio signals for positioning a receiver apparatus; a receiver apparatus comprising:

multiple antenna elements configured to receive the radio signals transmitted from the source; detection circuitry configured to detect a parameter of the received signals for at least some of the multiple antenna elements; testing circuitry configured to test the obtained parameters and configured to enable rejection of the received signals for use in positioning the source if the test fails, and configured to enable use of the received signals in positioning the source if the test passes.

According to various embodiments of the invention there is provided a system comprising:

multiple spatially separated sources, each configured to transmit radio signals for positioning a receiver apparatus; and a receiver apparatus comprising: at least one antenna element configured to receive the radio signals transmitted from the sources; detection circuitry configured to detect a parameter of the received signals for at least some of the multiple sources; and testing circuitry configured to test the obtained parameters and configured to enable rejection of the received signals for use in positioning the apparatus if the test fails, and configured to enable use of the received signals in positioning the apparatus if the test passes.

According to various embodiments of the invention there is provided an apparatus comprising: at least one processor; and at least one memory including computer program code the at least one memory and the computer program code configured to, with the at least one processor, cause the apparatus at least to perform testing parameters obtained from received signals associated with respective multiple antenna elements; enabling rejection of the received signals for use in positioning an apparatus if the test fails, and enabling use of the received signals in positioning the apparatus if the test passes.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
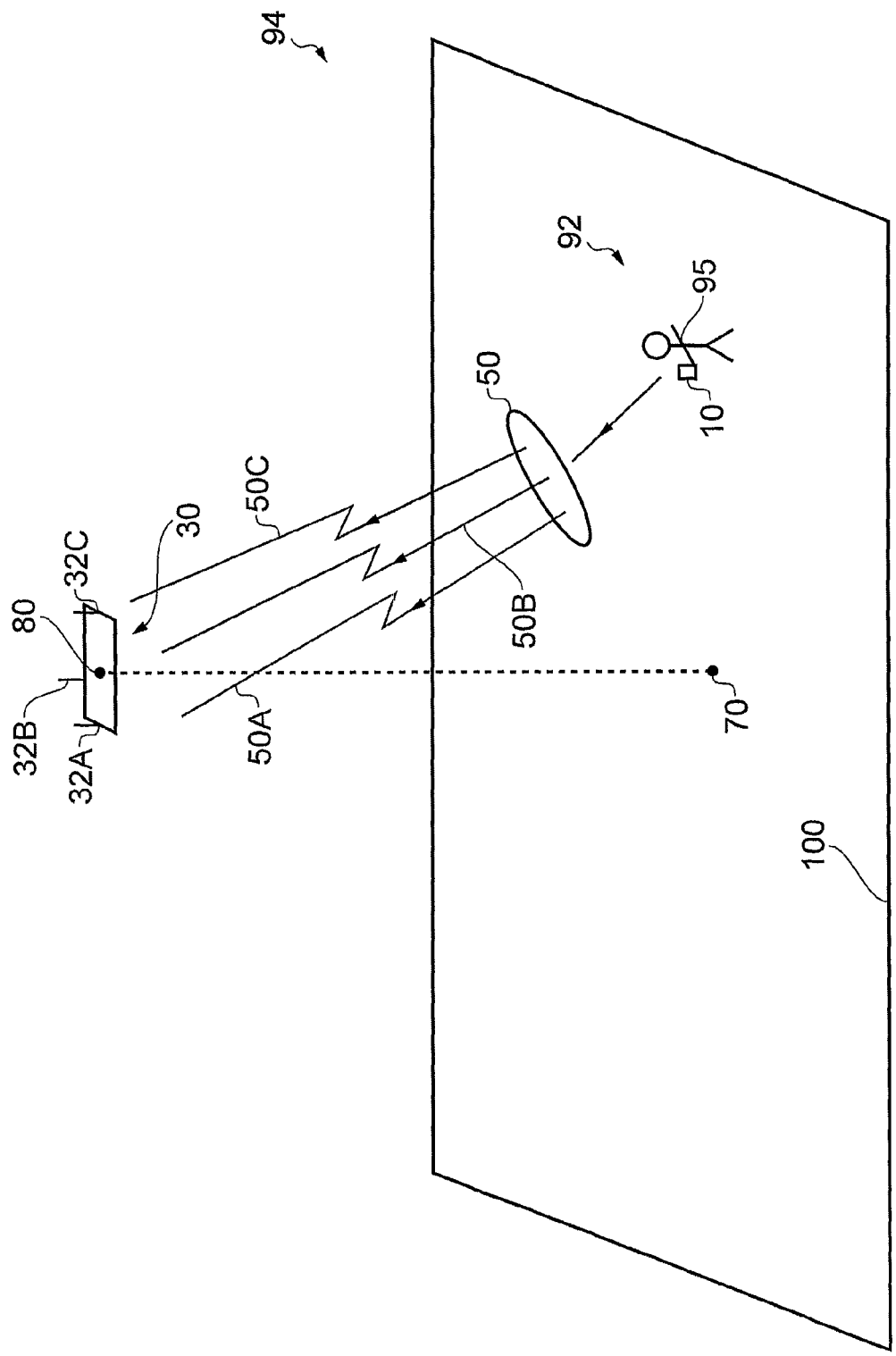
FIG. 1 illustrates an apparatus receiving radio signals from a transmitter.

FIG. 1 illustrates a person 92 (carrying a mobile radio communications apparatus 10) at a position 95 on a floor 100 of a building 94. The building 94 could be, for example, a shopping center or a conference center.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere such as on a wall.

The location 80 is directly above the point denoted with the reference numeral 70 on the floor 100 of the building. The receiver apparatus 30 is for enabling the position of the apparatus 10 to be determined although that is not necessarily the only function provided by the receiver apparatus 30. For example, the receiver apparatus 30 may be part of a transceiver for providing wireless internet access to users of apparatuses 10, for example, via wireless local area network (WLAN) radio signals.

The position 95 of the person 92 is defined by specifying a position along a bearing 82 (illustrated in FIG. 4) which runs from the location 80 of the receiver apparatus 30 through the location 95 of the apparatus 10, The bearing 82 is defined by an elevation angle θ and an azimuth angle φ.

The mobile apparatus 10 may, for example, be a hand portable electronic device such as a mobile radiotelephone. The apparatus 10 may transmit radio signals 50 periodically as beacons.

The radio signals may, for example, have a transmission range of 100 meters or less. For example, the radio frequency signals may be 802.11 wireless local area network (WLAN) signals, Bluetooth signals, Ultra wideband (UWB) signals or Zigbee signals.

Figure 2:
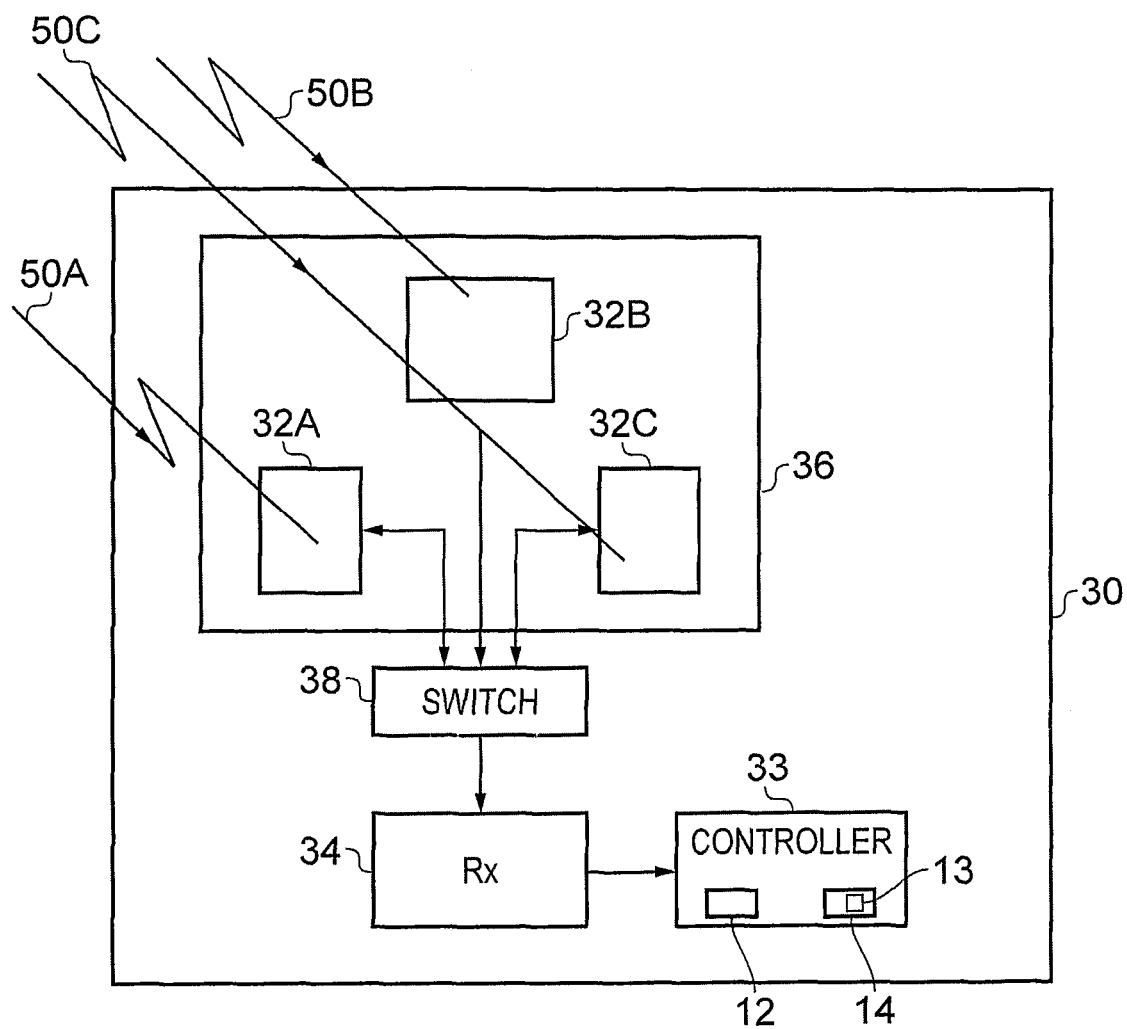
FIG. 2 is a schematic of a receiver apparatus.
Figure 2:
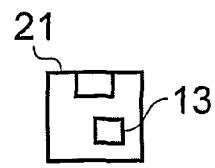

FIG. 2 schematically illustrates one example of the base station receiver apparatus 30. The receiver apparatus 30 comprises an antenna array 36 comprising a plurality of antenna elements 32A, 32B, 32C which receive respective radio signals 50A, 50B, 50C . . . transmitted from the mobile apparatus 10. The antenna array 28 is connected through switch 38 to receiver circuitry 34. The switch 38 may, for example, switch each antenna element 32 to the receiver circuitry 34 according to a defined sequence. The receiver circuitry 34 processes the received signals to obtain characteristics of the received signals 50. The receiver circuitry 34 provides an output to a controller 33.

The receiver circuitry 34 needs to obtain 'displacement information' from the received signals 50A, 50B, 50C that is dependent upon inter alia the relative displacements of the respective antenna elements 32A, 32B, 32C. In the example described in detail below, the displacement information includes phase information.

The receiver circuitry 34 may also be configured to demodulate the received signals.

For example, the receiver circuitry 34 may demodulate using I-Q modulation, also known as quadrature phase shift modulation. In this modulation technique, two orthogonal carrier waves (sine and cosine) are independently amplitude modulated to define a symbol. At the receiver circuitry 34, the amplitude of the two orthogonal carrier waves is detected as a complex sample and the closest matching symbol determined. It should be appreciated that an identical signal received at different antenna elements will be received with different phases and amplitudes because of the inherent phase characteristics of the antenna elements 32 when receiving from different directions and also because of the different times of flight for a signal 50 to each antenna element 32 from the transmitter apparatus 10. The inherent presence of this 'time of flight' information within the phases of the received signals 50 enables the received signals 50 to be processed, as described in more detail below, to determine the bearing 82 of the transmitter apparatus 10 from the receiver apparatus 30.

In the Figure only three different displaced antenna elements 32 are illustrated, although in actual implementations more antenna elements 32 may be used. For example 16 patch antenna elements could be distributed over the surface of a hemisphere. Three is the minimum number of radio signals required at the receiver apparatus 30 to be able to determine a bearing 82.

The apparatus 30 itself does not need to transmit to determine its position. Furthermore it alone may perform the processing necessary to determine a bearing 82 and to estimate, using the bearing and constraint information, the position of the apparatus 10 along the bearing 82.

The controller 33 may be any suitable type of processing circuitry. The controller 33 may be, for example, programmable hardware with embedded firmware. The controller 33 may be a single integrated circuit or a set of integrated circuits (i.e. a chipset). The controller 33 may also be a hardwired, application-specific integrated circuit (ASIC). In the illustrated example, the controller 33 may comprise a programmable processor 12 that interprets computer program instructions 13 stored in a memory 14.

The processor 12 is connected to write to and read from the memory storage device 14. The storage device 14 may be a single memory unit or a plurality of memory units.

The storage device 14 may store computer program instructions 13 that control the operation of the apparatus 30 when loaded into processor 12. The computer program instructions 13 may provide the logic and routines that enables the apparatus to perform the method illustrated in FIG. 3 and FIG. 5.

The computer program may arrive at the apparatus 30 via any suitable delivery mechanism 21. The delivery mechanism 21 may be, for example, a computer-readable storage medium, a computer program product, a memory device, a record medium such as a CD-ROM or DVD, an article of manufacture that tangibly embodies the computer program 13. The delivery mechanism may be a signal configured to reliably transfer the computer program 13.

The apparatus 30 may propagate or transmit the computer program 13 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

It will be appreciated by those skilled in the art that, for clarity, the controller 33 is described as being a separate entity to the receiver circuitry 34. However, it will be understood that the term controller 33 may relate not only to a main processor of an apparatus, but also processing circuitry included in a dedicated receiver chipset, and even to a combination of processing circuitry included in a main processor and a dedicated receiver chipset.

A chipset for performing embodiments of the invention may be incorporated within a module. Such a module may be integrated within the apparatus 30, and/or may be separable from the apparatus 30.

Figure 3:
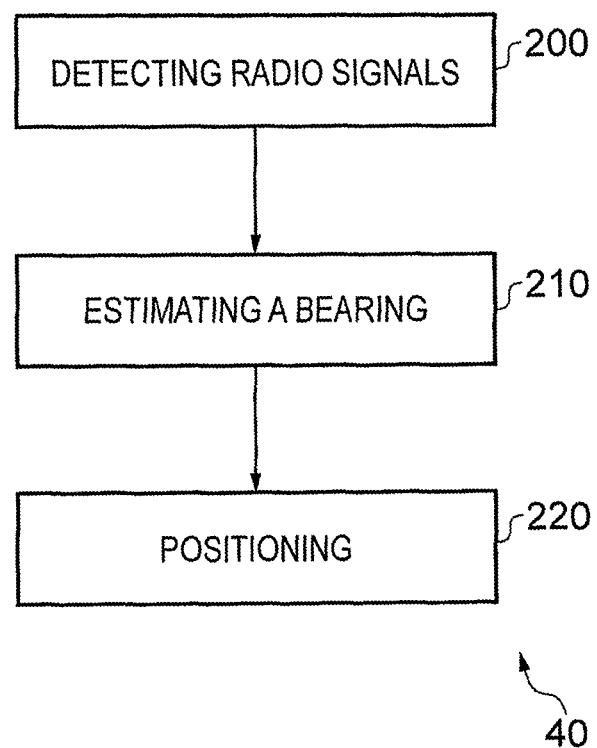
FIG. 3 is a flow diagram of a method of estimating a position.

FIG. 3 illustrates a method for estimating the position of the apparatus 10. Various embodiments of the method of FIG. 3 will be described hereinafter. Although the method will be described in the context of diversity reception, it should be appreciated that it is also applicable to diversity transmission. In diversity transmission, multiple radio signals are sent from spatially diverse antenna elements. In diversity reception, a radio signal is received at spatially diverse antenna elements.

In the following it will be assumed that the respective spatially diverse received radio signals 50A, 50B, 50C are received at the receiver apparatus 30 as illustrated in FIGS. 1 and 2.

At block 200 of the method of FIG. 3, the receiver apparatus 30 detects radio signals 50 including first, second and third radio signals 50A, 50B, 50C.

At block 210, the controller 33 of the apparatus 30 uses the detected radio signals 50 to estimate a bearing 82 of the apparatus 10 from the first location 80.

The processor 12 obtains comparable complex samples (i.e. samples that represent same time instant) for the three respective radio signals 50A, 50B, 50C.

The processor 12 then estimates a bearing 82. One method of determining the bearing 82 is now described, but other methods are possible.

Once comparable complex samples (i.e. samples that represent same time instant) from each antenna element 32 are obtained the array output vector y(n) (also called as snapshot) can be formed at by the processor 12.

$$y(n) = [x_1, x_2, \ldots, x_M]^T, \quad (1)$$

Where $x_i$ is the complex signal received from the ith RX antenna element 32, n is the index of the measurement and M is the number of RX elements 32 in the array 36.

A Direction of Departure (DoD) can be estimated from the measured snapshots if the complex array transfer function $a(\phi, \theta)$ of the RX array 36 is known, which it is from calibration data.

The simplest way to estimate putative DoDs is to use beamforming, i.e. calculate received power related to all possible DoDs. The well known formula for the conventional beamformer is $$P_{BF}(\varphi, \theta) = a^*(\varphi, \theta) \hat{R} a(\varphi, \theta), \quad (2)$$

Where, $$\hat{R} = \frac{1}{N} \sum_{n=1}^{N} y(n) y^*(n)$$

is the sample estimate of the covariance matrix of the received signals, $a(\phi, \theta)$ is the array transfer function related to the DoD $(\phi, \theta)$, $\phi$ is the azimuth angle and $\theta$ is the elevation angle.

Once the output power of the beamformer $P_{BF}(\phi, \theta)$ is calculated in all possible DoDs the combination of azimuth and elevation angles with the highest output power is selected to be the bearing 82.

The performance of the system depends on the properties of the RX array 36. For example the array transfer functions $a(\phi, \theta)$ related to different DoDs should have as low correlation as possible for obtaining unambiguous results.

Correlation depends on the individual radiation patterns of the antenna elements 32, inter element distances and array geometry. Also the number of array elements 32 has an effect on performance. The more elements 32 the array 36 has the more accurate the bearing estimation becomes. In minimum there should be at least 3 antenna elements 32 in planar array configurations but in practice 10 or more elements should provide good performance.

Next, at block 220 the processor 12 estimates a position of the apparatus 10 using a bearing and constraint information.

In some embodiments of the invention, the use of constraint information enables the processor 12 to determine the location of the apparatus 10 along the estimated bearing 82.

Figure 4:
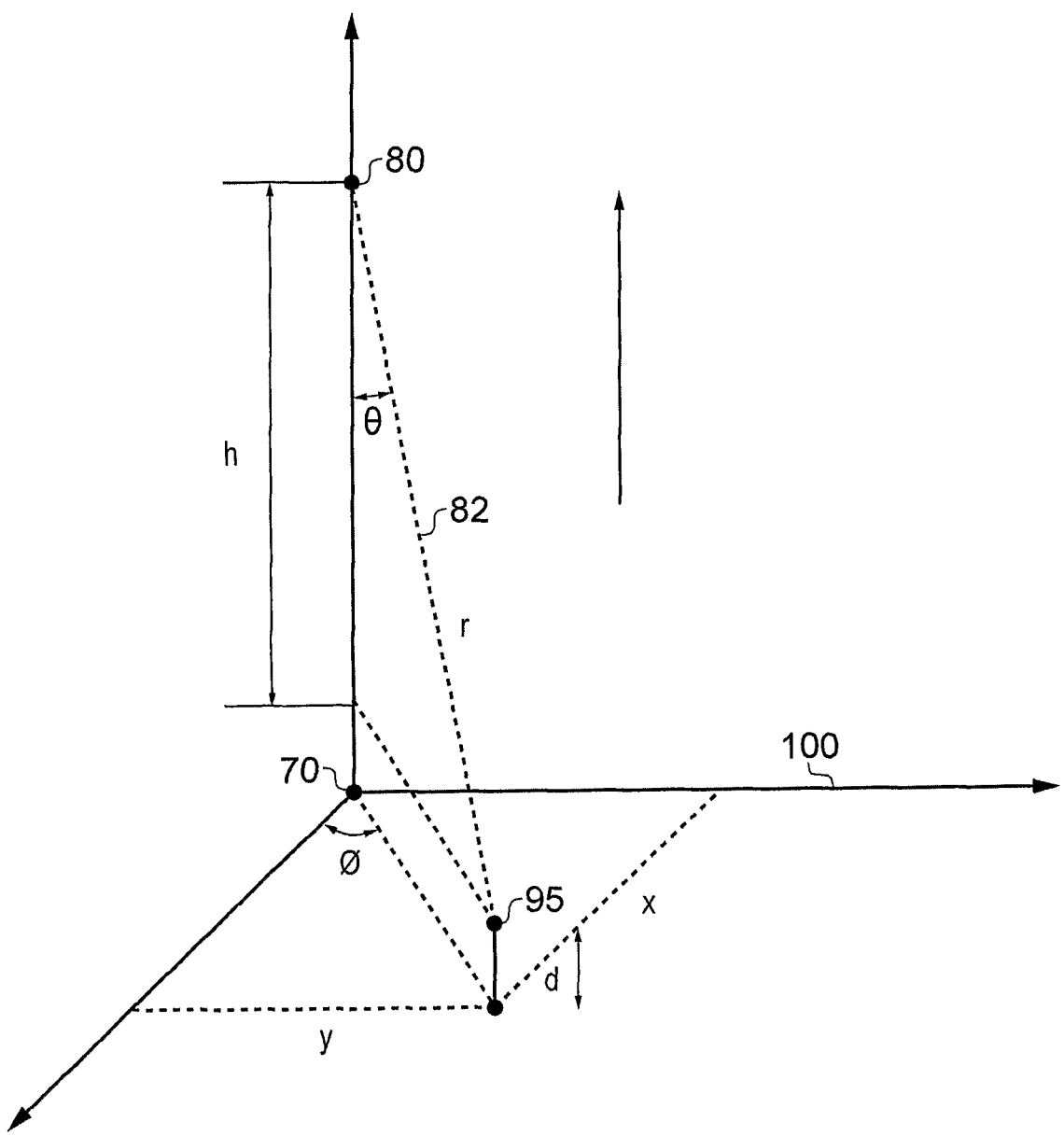
FIG. 4 illustrates a schematic for estimating the position using a displacement or range as a constraint.

FIG. 4 also illustrates the bearing 82 from the location 80 of the receiver apparatus 30 to the location 95 of the transmitter apparatus 10, which has been estimated by the processor 12 following reception of the radio signals 50. The bearing 82 is defined by an elevation angle $\theta$ and an azimuth angle $\phi$.

Figure 5:
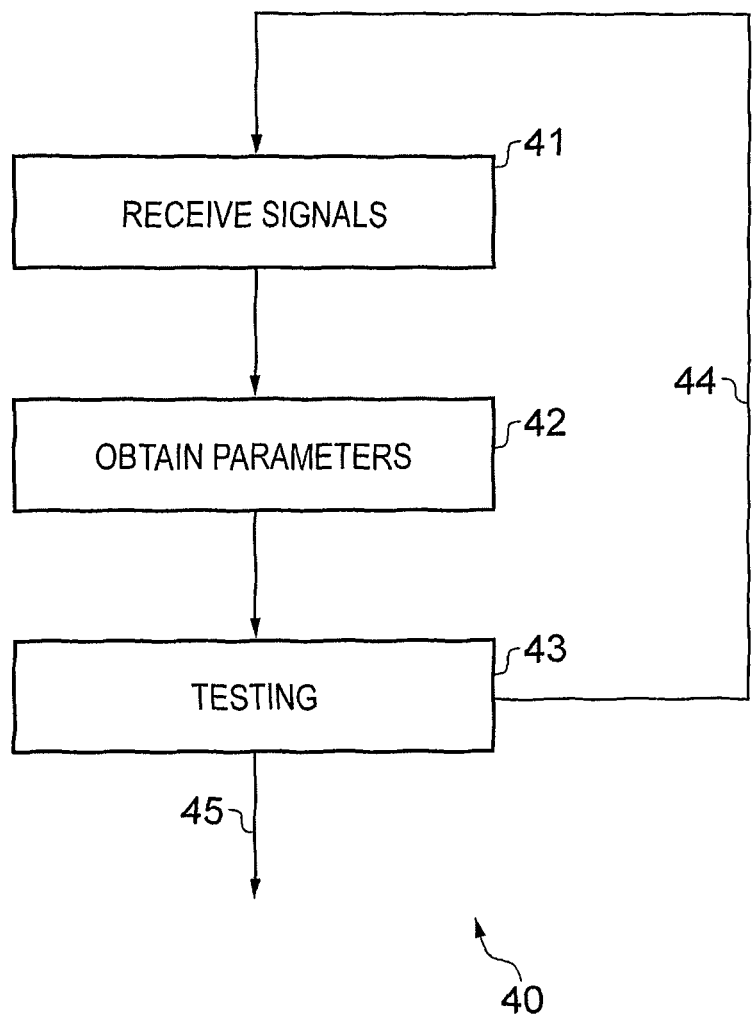
FIG. 5 schematically illustrates a method for determining whether or not to processes received signals to determine a bearing.
Figure 6:
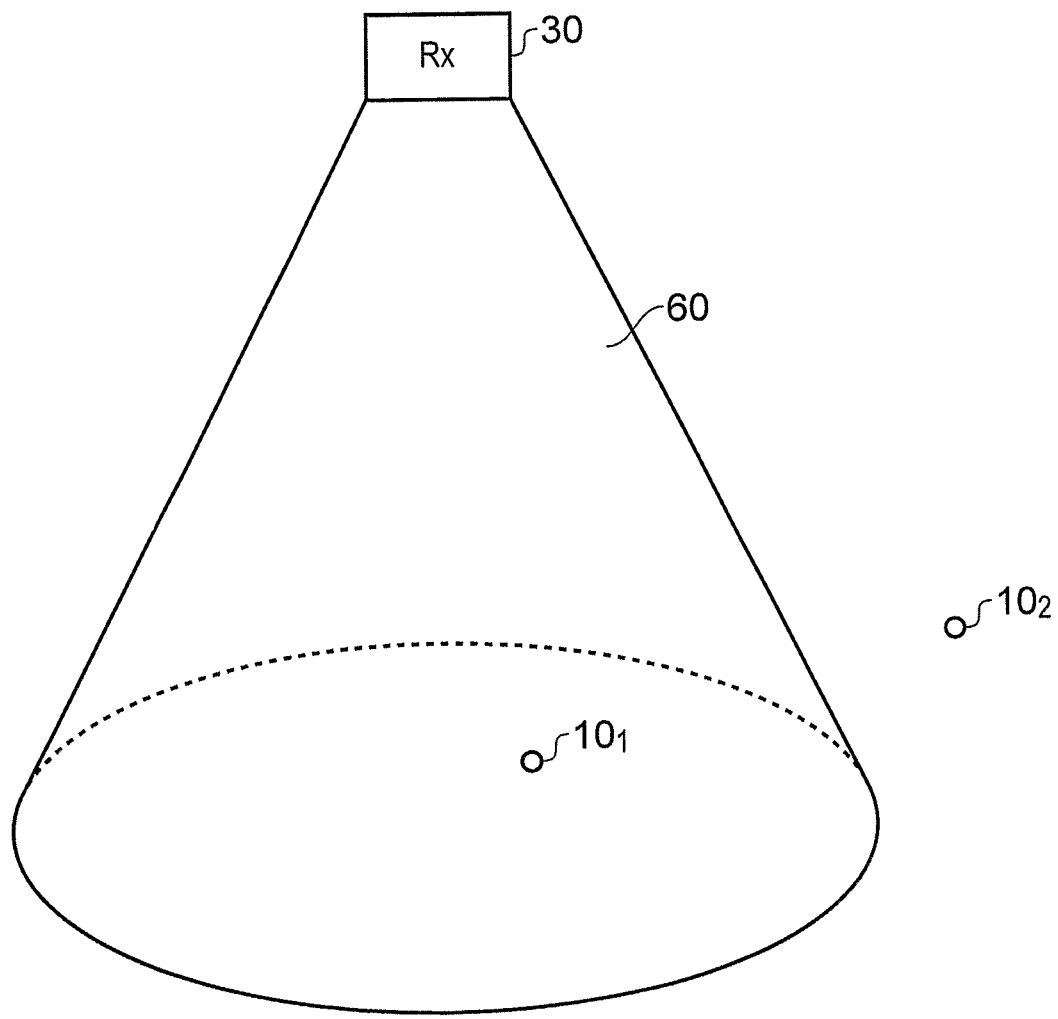
FIG. 6 schematically illustrates a reception volume defined by an array of multiple antenna elements.

The processor 12 may estimate the position of the apparatus 10 relative to the location 80 of the receiver apparatus 30 in coordinates using the bearing (elevation angle $\theta$, azimuth angle $\phi$) and constraint information e.g. vertical displacement h (FIG. 4) or an additional bearing (FIG. 5) or range r (FIG. 4, FIG. 6). The processor 12 may estimate the position of the apparatus 10 in Cartesian coordinates by converting the coordinates using trigonometric functions.

It will be appreciated that the processing required by processor 12 to solve Equation 2 and determine a bearing and then a position is significant. It would be advantageous if this processing were only carried on when the received signals 50 can be trusted to provide an accurate position after processing.

FIG. 5 schematically illustrates a method 40 for determining whether or not to processes received signals 50 to determine a bearing. Although the method will be described in the context of diversity reception, it should be appreciated that it is also applicable to diversity transmission. In diversity transmission, multiple radio signals are sent from spatially diverse antenna elements. In diversity reception, a radio signal is received at spatially diverse antenna elements.

At block 41, signals 50A, 50B, 50C are received at multiple antenna elements 32A, 32B, 32C of an apparatus 30.

At block 42, a parameter 46 of the received signals 50 is obtained for at least some of the multiple antenna elements 32.

At block 43, the obtained parameters 46 are tested. If the test fails 44, the received signals 50 are rejected for use in positioning the transmitter apparatus 10 and the method returns to block 41. If the test passes 45, the received signals 50 are used for positioning the transmitter apparatus 10 and the method moves to block 210 in FIG. 3.

The parameter 46 is dependent upon signal strength and is typically received power.

Figures 8A, 8B:
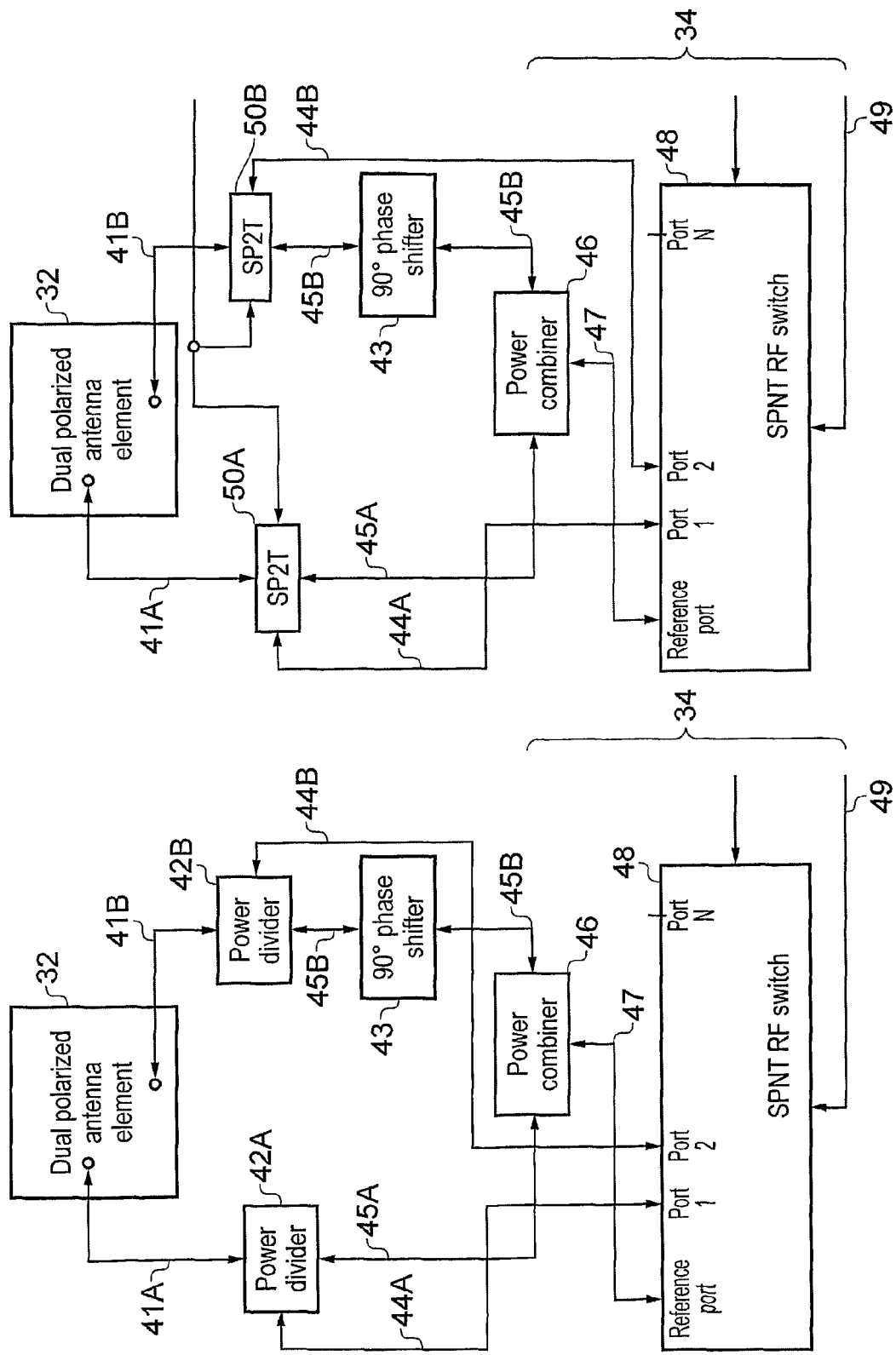
FIGS. 8A and 8B schematically illustrate how a parameter of the received signals is obtained.

The obtained parameter 46 (received power) may be measured in such a way that it is independent of polarization of the received signals 50. Referring to FIGS. 8A and 8B, this is achieved by combining in reception circuitry 34 the power of the both ports of a dual polarized antenna element 32. Two orthogonal feeds 41A, 41B are taken from a circularly polarized antenna element 32. A power divider 42A, 42B or a single pole two terminal (SP2T) switch 50A, 50B is used to divide each feed 41A, 41B into a first signal 44A, 44B for direction finding and a second signal 45A, 45B for power measurement. A $\pi/2$ phase difference is introduced using a phase shifter 51 into one of the two second signals 45B and then the two second signals 45A, 45B are combined in a power combiner 46. The combined power output 47 is provided to a reference port of a single pole N terminal (SPNT) radio frequency (RF) switch 48. The second signals 45A, 45B for power measurement are provided to other ports of the SPNT RF switch 48. The output 49 from the switch 48 is then further processed.

The testing 43 may detect whether the parameters 46 satisfy a defined relationship.

For example, referring to FIG. 6, the array 36 of multiple antenna elements 32 define a reception volume 60. Signals 50 transmitted by a source transmitter apparatus 10$_1$, positioned inside the reception volume 60, can be trusted for use by the apparatus 30 in positioning. The reception volume 60 is shown is merely illustrative.

A test pass 45 is indicative that a source apparatus 10$_1$ of the received signals 50 is within the reception volume 60.

A test fail 44 is indicative that a source apparatus 10$_2$ of the received signals 50 is outside the reception volume 60.

The testing 43 may compare the parameter 46 for a reference antenna element in the array 36 against the parameter 46 for one or more other antenna elements 32 in the array.

The comparison has a first characteristic when the transmitter apparatus 10$_1$, which is the source of the received radio signals 50 is inside the reception volume 60. For example, if there are N antenna elements, let n denote the selected reference antenna element, let $P_n$ represent the received power at the reference antenna element and $P_m$ represent the received power at one of the other N−1 antenna elements. If the receiver power at the reference antenna element exceeds the received power of each of the other antenna elements by at least a threshold $T_1$ (which may be positive or negative) then it can be determined that the source apparatus 10$_1$ of the received radio signals 50 is inside the reception volume 60. The first characteristic may be expressed as:

$$P_n > \max(P_m + T_1)_{m \neq n,\ 1 < m < N}$$

If the power for the reference element is higher than any of the other antenna elements 32, it can be assumed that the signal is coming with an angle at which the array 36 is operating correctly and thus the signals 50 can be further processed.

The comparison has a second characteristic when the apparatus 10$_2$, which is the source of the received radio signals 50 is outside the reception volume 60. For example, if there are N antenna elements, let n denote the selected reference antenna element, let $P_n$ represent the received power at the reference antenna element and $P_m$ represent the received power at one of the other N−1 antenna elements. If the received power at the reference antenna element is less than the minimum received power at the other antenna elements, adjusted by a threshold $T_2$, then it can be determined that the source apparatus 10$_2$ of the received radio signals is outside the reception volume 60. The second characteristic may be expressed as:

$$P_n < \min(P_m + T_2)_{m \neq n,\ 1 < m < N}$$

If the power for the reference element is lower than in any of the other antenna elements 32, it can be assumed that the signal is coming with a very high elevation angle at which the array is not operating correctly and thus the signals 50 can be discarded.

The reference antenna element may be selected as part of a calibration process for the antenna array 36 and the reception volume 60. The reference antenna element may be selected so that a ratio of the parameter 46 for the reference antenna element to the one or more other antenna elements 32, when the source apparatus 10$_1$ of the received signals 50 is within the reception volume 60, is very much greater than a ratio of the parameter 46 for the reference antenna element to the one or more other antenna elements 32, when the source apparatus 10$_2$ of the received signals 50 is outside the reception volume 60.

The computer program instructions 13 which when loaded into the processor 12 enable the processor to: test parameters obtained from received signals 50 associated with respective multiple antenna elements; enable rejection of the received signals for use in positioning an apparatus if the test fails, and enable use of the received signals in positioning the apparatus if the test passes.

Figure 7:
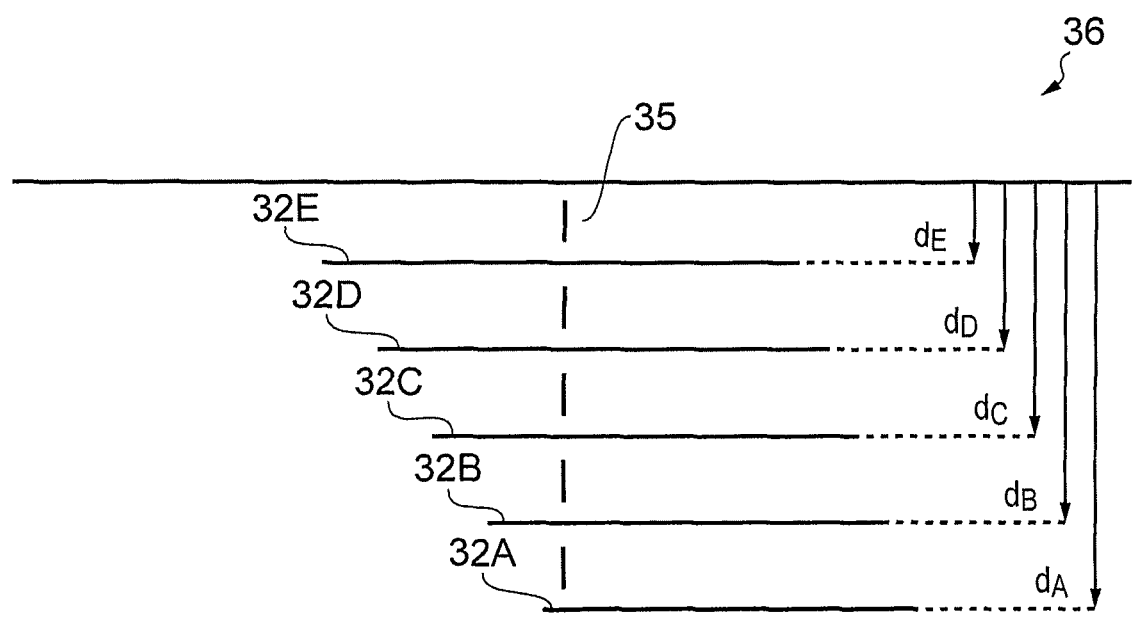
FIG. 7 schematically illustrates one example of a suitable antenna array.

FIG. 7 schematically illustrates one example of a suitable antenna array 36. In this example, the antenna array 36 is a ceiling mounted antenna array 36. The antenna array 36 comprises, as a central reference antenna element, a dual polarized patch antenna 32A aligned along a first direction 35 that is orthogonal to the ceiling. Additional annular dual polarized elements 32B, 32C, . . . 32E circumscribe the central reference antenna element 32A but with different respective displacements d along the first direction. The smaller the displacement d, the larger the radius of the annuluses of the annular dual polarized elements 32B, 32C, . . . 32E.

The antenna elements 32 are enabled in sequence by the switch 38 (FIG. 2). The switch 38 is configured to control the relative phase or order of the multiple antenna elements, which defines a reception volume 60.

In this configuration the main beam of the radiation pattern of the center antenna covers most (all) of the elevation angles where the array is expected to operate well.

The tuning point of an automatic gain controller (AGC) connected to the antenna array 36 is selected so that clipping should not happen if the signal source apparatus 10 is within the reception volume 60 where the antenna array 36 is used for positioning.

The antenna array 36 may only give reliable location estimate within a limited elevation angle range (e.g. $0 < \theta > 60$ degrees).

The method 40, may be adapted when diversity transmission is used. When diversity transmission is used, instead of having diverse antenna elements 32A, 32B, 32C which receive respective signals 50A, 50B, 50C from the same source apparatus 10, the apparatus 30 needs only one antenna element 32 which receives signals 50A, 50B, 50C from respective spatially diverse source transmitter apparatuses 10A, 10B, 10C.

When diversity transmission is used, the apparatus 30 is typically a mobile apparatus and the spatially diverse signals are provided by distinct base station apparatuses 10. That is, the diversity is provided by the infrastructure. The mobile apparatus 30 positions itself relative to the known location of the base station apparatuses 10.

In contrast, when diversity reception is used, the apparatus 30 is typically a base station apparatus that is fixed. That is, the diversity is provided by the infrastructure. The apparatus 30 positions the apparatus 10 which is typically a mobile apparatus relative to the known location of the apparatus 30.

When diversity transmission is used, the method 40 is adapted. At block 41, signals 50A, 50B, 50C associated with multiple antenna elements 32A, 32B, 32C are received. However, rather than the radio signals 50A, 50B, 50C being received at multiple antenna elements 32A, 32B, 32C of the apparatus 30, the radio signals 50A, 50B, 50C are transmitted from spatial diverse apparatus 10A, 10B, 10C and received at the apparatus 30.

Embodiments provide for the conditional use of received signals 50 for positioning. Received signals 50 are used for positioning only if a test of parameters obtained from received signals 50 passes. If the test fails, the received signals 50 are rejected.

The amount of bearing estimates is consequently reduced by recognizing mistrusted signals 50 before processing.

If diversity transmission is performed, the apparatus 30 is mobile and its battery life can be increased, processor time given to other applications, or the location update frequency can be increased.

If diversity reception is performed, the apparatus 30 is a server serving multiple mobile apparatuses 10. In this case, avoiding the processing of mistrusted data leads to a saving in the computation resources of apparatus 30. This can increase the positioning system capacity (number of positioned apparatus 10).

The method 40 provides a simple and fast strategy for discarding mistrusted data which leads to a reduction in the positioning algorithm complexity, saving of processor time, power saving, and increased system reliability without scarifying positioning accuracy.

The blocks illustrated in the FIGS. 3 and 5 may represent steps in a method and/or sections of code in the computer program 13. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed. For example, the apparatus 10 may not function as a mobile telephone. It may, for example, be a portable music player having a receiver for receiving radio signals.

Various examples of constraint information have been given in the preceding paragraphs, but the term "constraint information" it is not intended to be limited to these examples.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    receiving signals associated with multiple antenna elements, wherein the signals are received by a terrestrial based receiver from the multiple antenna elements;
    obtaining a parameter of a subset of the received signals for at least some of the multiple antenna elements; and
    testing the obtained parameters;
    if the test fails, rejecting the received signals without processing the received signals for use in positioning an apparatus to be positioned; and
    if the test passes, processing the received signals to determine a three-dimensional bearing of the apparatus from a first location.

2. A method as claimed in claim 1, wherein the parameter is dependent upon signal strength.

3. A method as claimed in claim 1, wherein the parameter is received power.

4. A method as claimed in claim 1, wherein the obtained parameter is independent of polarization of the received signals.

5. A method as claimed in claim 1, wherein the testing detects whether the parameters satisfy a defined relationship.

6. A method as claimed in claim 1, wherein the multiple antenna elements define a reception volume and a test pass is indicative that a source of the received signals is within the reception volume.

7. A method as claimed in claim 1, wherein the multiple antenna elements define a reception volume and a test fail is indicative that a source of the received signals is outside the reception volume.

8. A method as claimed in claim 1, wherein testing compares the parameter for a reference antenna element against the parameter for one or more other antenna elements and the comparison has a first characteristic for a test pass.

9. A method as claimed in claim 1, wherein testing compares the parameter for a reference antenna element against the parameter for one or more other antenna elements and the comparison has a second characteristic for a test fail.

10. A method as claimed in claim 1, wherein the multiple antenna elements are antenna elements of a ceiling mounted antenna array comprising, as a central reference antenna element, a dual polarized patch antenna aligned along a first direction and additional annular dual polarized elements circumscribing the central reference antenna element but with different displacements along the first direction.

11. An apparatus comprising:
    detection circuitry configured to detect a parameter of a subset of received signals associated with respective multiple antenna elements, wherein the signals are received by a terrestrial based receiver having the multiple antenna elements; and
    testing circuitry configured to test the obtained parameters and configured to enable rejection of the received signals without processing the received signals for use in positioning an apparatus to be positioned if the test fails, and configured to enable processing of the received signals to determine a three-dimensional bearing of the apparatus from a first location if the test passes.

12. An apparatus as claimed in claim 11, further comprising: a combiner for combining power for different polarizations of the same antenna element to determine a parameter.

13. An apparatus as claimed in claim 11, further comprising: timing control circuitry configured to control the relative phase of the multiple antenna elements, wherein the timing control circuitry and the relative configuration of the multiple antenna elements define a reception volume and a test pass is indicative that a source of the received signals is within the reception volume.

14. An apparatus as claimed in claim 11, wherein the testing circuitry is configured to compare the parameter for a reference antenna element against the parameter for one or more other antenna elements.

15. An apparatus as claimed in claim 11, wherein the apparatus is configured for diversity reception and comprises a ceiling mounted antenna array comprising, as a central reference antenna element, a dual polarized patch antenna aligned along a first direction and additional annular dual polarized elements circumscribing the central reference antenna element but with different displacements along the first direction.

16. An apparatus comprising:
    at least one processor; and
    at least one memory including computer program code
    the at least one memory and the computer program code configured to, with the at least one processor, cause the apparatus at least to perform
    testing parameters obtained from a subset of received signals associated with respective multiple antenna elements, wherein the signals are received by a terrestrial based receiver having the multiple antenna elements;

enabling rejection of the received signals without processing the received signals for use in positioning an apparatus to be positioned if the test fails, and enabling processing of the received signals to determine a three-dimensional bearing of the apparatus from a first location if the test passes.

\* \* \* \* \*